United States Patent Office 3,267,571
Patented August 23, 1966

3,267,571
PET FOOD SERVER, CHOPPER, AND COVER
Arthur Joseph Cavanaugh, 12 Christopher Lane,
Sudbury, Mass. 01776
Filed Apr. 7, 1964, Ser. No. 358,399
2 Claims. (Cl. 30—116)

This invention relates to a food server and more particularly to a device that is utilized to remove pet food from the container that the food is packed in, and to be used as a chopper of said food and a cover for said food container.

The object of the invention is to provide a suitable means to remove a designed portion of pet food from the container that the food is packed in.

Another important object of the invention is to provide a means for chopping and mixing the removed food.

The final object of the invention is to provide a suitable cover for the amount of food still left in the container.

Figure 1:
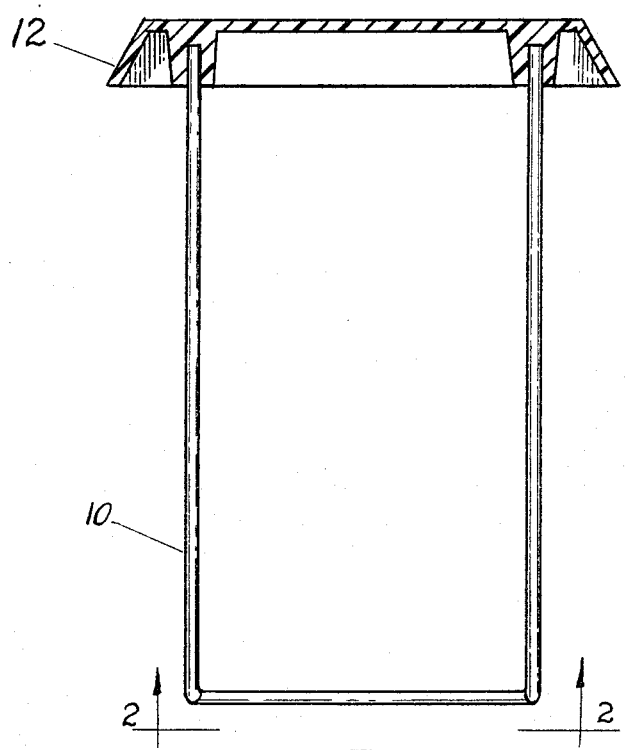
FIGURE 1 is a sectional view taken on line 1—1 of FIGURE 2.
Figure 2:
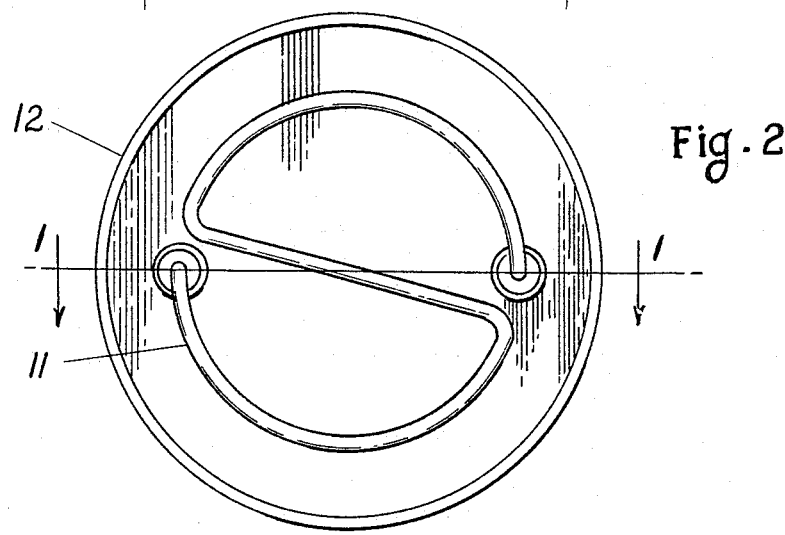
FIGURE 2 is a bottom view taken on line 2—2 of FIGURE 1.

Referring to the drawings in detail the implement comprises a body portion indicated by the reference character 10 which is preferably a stainless steel wire formed into an S shape as at 11 and whose ends are pressed into the plastic cover 12. The cover 12 can be held in one hand and the S-shaped end 11 inserted into a (can) container, having pet food, to the depth desired for removal. The S-shaped end separates the food from the inner wall of the container. By rotating the implement ½ turn the center bar of the S-shaped portion severs the pet food. By withdrawing the implement the desired pet food comes with it.

The implement can now be sharply rapped against a pet food dish thus removing the pet food from the implement.

By pressing the S-shaped end into the food with a chopping motion the food can be broken up into edible size.

If there is more food left in the original pet food container the S-shaped end 11 can be inserted into the container and pushed all the way to the bottom, the plastic cover 12 will then enclose the open end of the container.

I claim:

1. A device for removing soft foods from a container comprising; a flat disc-shaped body member having an upturned annular flange, said body member further having a pair of diametrically spaced, upwardly extending projections, a wire comprising a pair of longitudinally extending leg members joining an intermediate S-shaped portion, the plane of which extends generally transverse to said leg members, each of said projections having a longitudinal bore therein receiving and securing the free terminals of said wire, said S-shaped portion extending parallel to said body member whereby said S-shaped portion may be inserted into the container for removal of said food.

2. The device of claim 1 wherein said body member is composed of extruded plastic and is adapted to cover the container when the wire is inserted in the unused portion of said food within said container.

References Cited by the Examiner
UNITED STATES PATENTS 2,254,763  9/1941  Wolfe.
2,653,746  9/1953  MacDonald _____ 31—11
2,808,791  10/1957  Phillips et al.

WILLIAM FELDMAN, Primary Examiner.
R. V. PARKER, Jr., Assistant Examiner.